United States Patent [19]
Bergmann et al.

[11] Patent Number: 5,265,419
[45] Date of Patent: Nov. 30, 1993

[54] SOOT-PARTICLE FILTER FOR AFTER-TREATMENT OF THE EXHAUST GASES OF DIESEL ENGINES

[75] Inventors: Horst Bergmann, Esslingen-Krummenacker; Helmut Daudel, Schorndorf, both of Fed. Rep. of Germany

[73] Assignee: Mercedes-Benz AG, Fed. Rep. of Germany

[21] Appl. No.: 9,664

[22] Filed: Jan. 27, 1993

[30] Foreign Application Priority Data

Feb. 28, 1992 [DE] Fed. Rep. of Germany ....... 4206226

[51] Int. Cl.$^5$ ................................. F01N 3/28
[52] U.S. Cl. ........................ 60/297; 60/299; 60/311; 422/169; 422/180; 422/181
[58] Field of Search .................. 60/297, 299, 311; 422/169, 174, 180, 181

[56] References Cited

U.S. PATENT DOCUMENTS

| | | | |
|---|---|---|---|
| 4,669,261 | 6/1987 | Wörner | 60/299 |
| 4,811,559 | 3/1989 | Henkel | 60/303 |
| 5,042,249 | 8/1991 | Erdmannsdoerfer | 60/311 |

FOREIGN PATENT DOCUMENTS 3828516 3/1989 Fed. Rep. of Germany .

Primary Examiner—Douglas Hart
Attorney, Agent, or Firm—Evenson, McKeown, Edwards & Lenahan

[57] ABSTRACT

The invention relates to a soot-particle filter for aftertreatment of the exhaust gases of diesel engines by oxidation and the supply of thermal energy. Exhaust-gas-permeable supporting tubes extend in a filter housing and have an applied catalytic filter winding, via which exhaust gases flow radially from outside to inside into the supporting tubes. An exhaust-gas-permeable insert with a catalytically effective surface is arranged in each supporting tube to thereby enhance the effectiveness of the filter without increasing its overall size.

8 Claims, 2 Drawing Sheets

SOOT-PARTICLE FILTER FOR AFTER-TREATMENT OF THE EXHAUST GASES OF DIESEL ENGINES

BACKGROUND AND SUMMARY OF THE INVENTION

The invention relates to a soot-particle filter for after-treatment of the exhaust gases of diesel engines by oxidation and the supply of thermal energy, having supporting tubes which extend in the filter housing next to one another, which supporting tubes are closed at one end face and are provided at the other end face with a clean-gas outflow opening and on which there is applied at least one catalytic filter winding, via which exhaust gases flow radially from outside to inside into the permeable supporting tubes.

Such a soot-particle filter is known from German Patent Document De 38 28 516 C1 and comprises numerous supporting tubes which extend in the filter housing with parallel axes and which are of a perforated design and on which a ceramic yarn is wound crosswise in a multi-ply manner as a filter layer. The supporting tubes are closed at one end face and are provided at the other end face with a clean-gas outflow opening, as a result of which the exhaust gases flowing into the filter housing pass radially from outside to inside through each filter layer and each perforated supporting tube and emerge as a clean gas from the outflow openings of the supporting tube.

An object of the invention is to further improve a soot-particle filter of the generic type with a view to lowering the emission of pollutants, without at the same time increasing the overall dimensions of the soot-particle filter.

This object is achieved according to preferred embodiments of the invention by providing an arrangement wherein an elongated, exhaust-gas-permeable insert with a catalytically effective surface is provided in each supporting tube.

The pollutant fractions in the exhaust gas can be further reduced by the surface-enlarging measures within the soot-particle filter, namely in the hollow space of the supporting tubes. Consequently, in spite of retaining the overall dimensions of the soot-particle filter, a further reduction in the emission of pollutants can be realized in a simple way.

The inserts with various types of support geometries are also suitable as a retrofitting kit for fitting at a later date into the supporting tubes of the soot-particle filters described at the beginning.

Other objects, advantages and novel features of the present invention will become apparent from the following detailed description of the invention when considered in conjunction with the accompanying drawings.

DETAILED DESCRIPTION OF THE DRAWINGS

Figure 1:
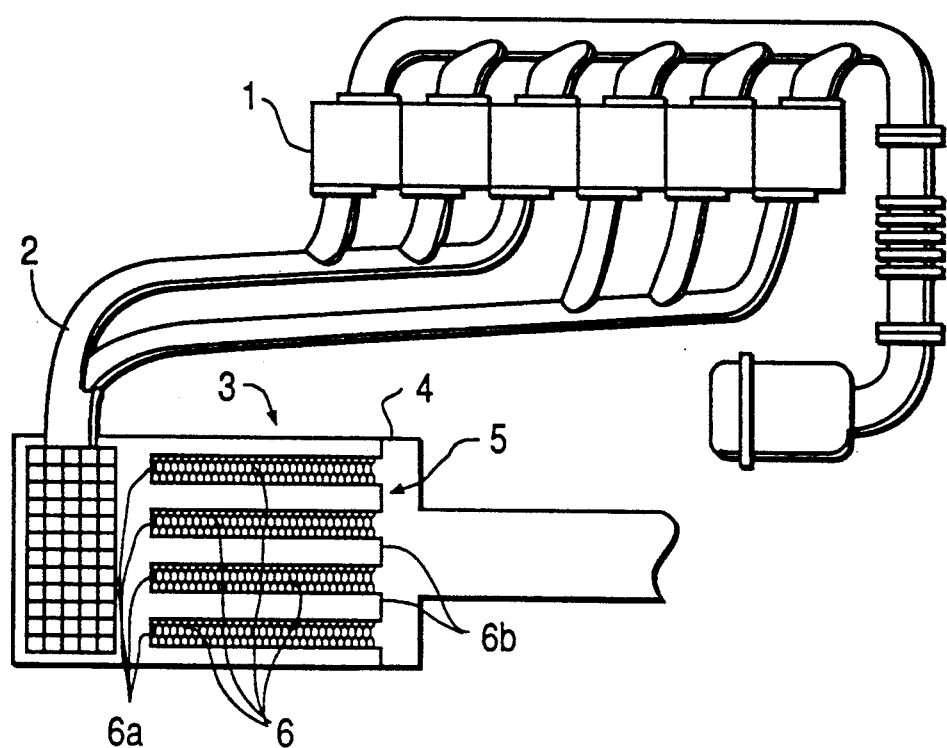
FIG. 1 is a schematic view which diagrammatically shows a diesel engine with a soot-particle filter in the exhaust pipe, constructed according to preferred embodiments of the invention.

FIG. 1 shows an air-compression fuel-injection internal-combustion engine 1 having an exhaust pipe 2, in which a soot-particle filter assembly 3 is arranged. In the filter housing 4 of this soot-particle filter assembly 3 there is accommodated a group of filter cartridges 5, extending with parallel axes. Each filter cartridge 5 comprises a perforated supporting tube 6 and a filter layer 7 would up on the tube 6 and formed by a ceramic yarn.

Figure 2:
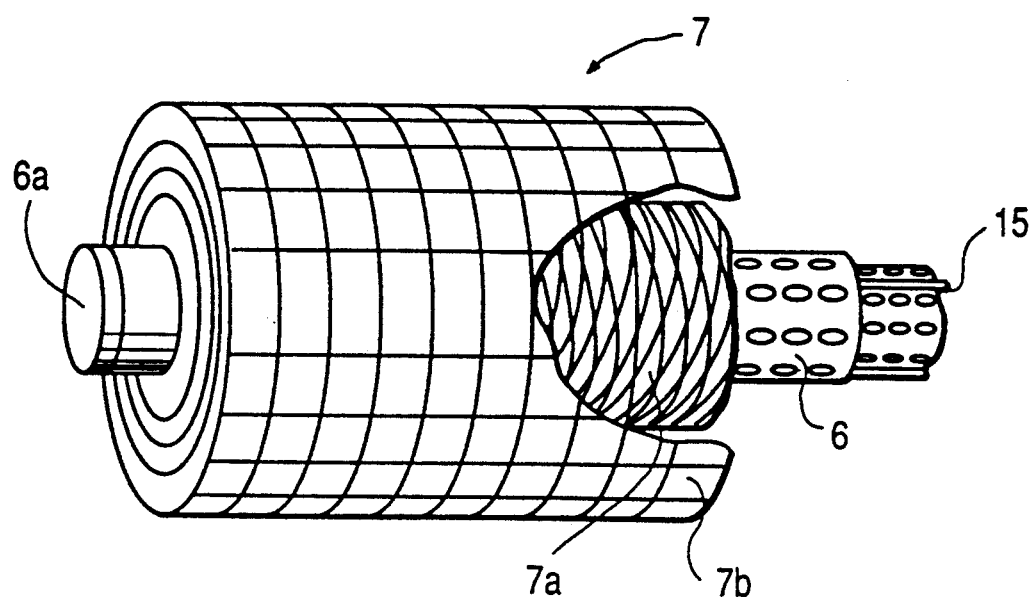
FIG. 2 is a schematic, enlarged representation part-sectional view of a preferred embodiment of filter cartridge of the present invention.

FIG. 2 shows the filter layer 7, composed of two filter windings 7a, 7b, on the supporting tube 6, which acts as a support and comprises a catalytically coated perforated metal sheet and is closed at its tube end 6a lying in the direction of oncoming flow, but is open at the opposite tube end 6b.

Figure 3:
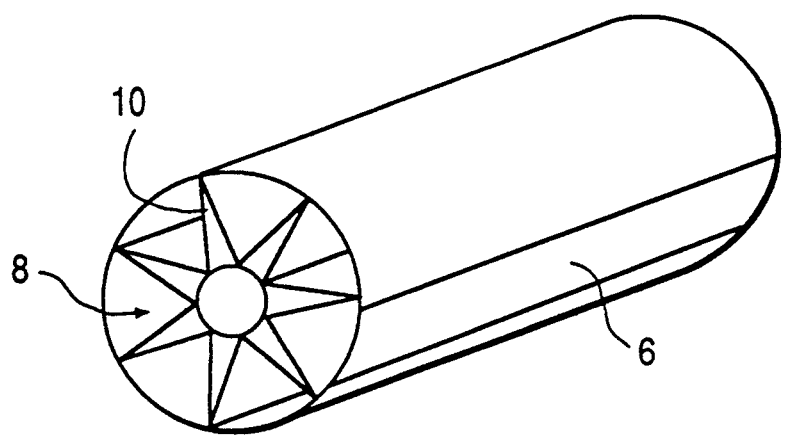
FIGS. 3-5 are schematic perspective views which show various types of configurations of inserts intended for supporting tubes, constructed according to respective preferred embodiments of the invention.
Figure 4:
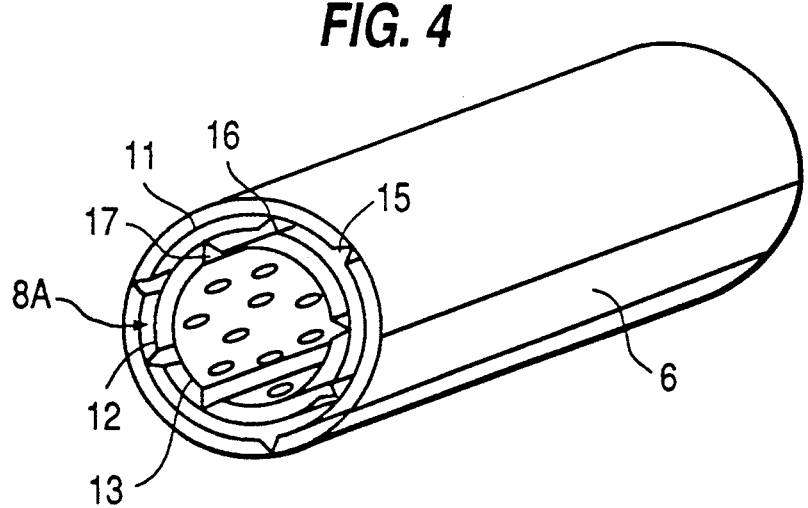
Figure 5:
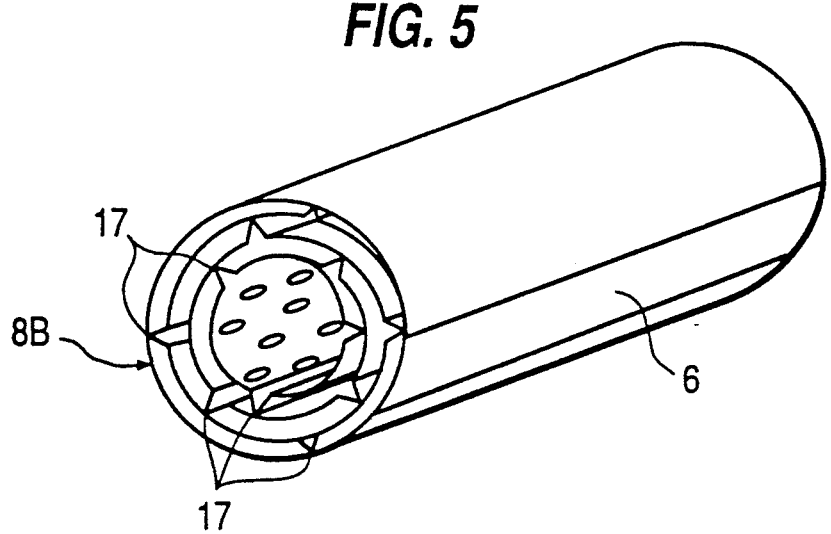

According to FIGS. 3, 4, 5, each supporting tube 6 is provided with an insert 8, 8A, 8B, which extends as an integrated oxidation catalyst over the entire length of the supporting tube 6. The insert 8, 8A, 8B, may be designed as a catalyst or be catalytically coated.

The insert 8, 8A, 8B, may take various forms. FIG. 3 shows a star-shaped insert 8, which may be designed for example as a perforated-sheet star, ceramic star or sintered-metal star with catalytically active surface. The basic body comprises a tube 9, from which there protrude prongs 10, which are formed from metal wire, screen fabric or perforated metal sheet.

The star-shaped insert 8 may, however, also be at the same time the supporting tube 6, that is performing the function of the support itself for the filter windings.

The insert 8A according to FIG. 4 comprises tubes 11, 12, 13 which lie concentrically with respect to one another and have pressed-out protuberances 14, 15, 16, designed as supporting webs or spacers.

The insert 8B according to FIG. 5 is of a spiral design and, like the exemplary embodiment according to FIG. 4, is provided with pressed-out protuberances, which are denoted by 17.

The inserts 8, 8A, 8B and supporting tube 6 may be combined to form a contructional unit or comprise a one-part structure according to preferred embodiments of the invention.

The constructional unit or the inserts pushed into the supporting tube may be designed as perforated sheet-metal tubes, screen tubes, ceramic tubes as a catalyst or with a catalytic coating.

Utilizing a hollow space in the supporting tube by integration of an oxidation catalyst makes it possible, without making the actual soot-particle filter any larger, to reduce further the emission of pollutants with respect to hydrocarbon, carbon monoxide, nitrogen oxides and odorous substances.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A soot-particle filter for after-treatment of the exhaust gases of diesel engines by oxidation and the supply of thermal energy, having supporting tubes which extend in the filter housing next to one another, which supporting tubes are closed at one end face and are provided at the other end face with a clean-gas outflow opening and on which there is applied at least one catalytic filter winding, via which exhaust gases flow radially from outside to inside into the permeable supporting tubes, wherein an elongated, exhaust-gas-permeable insert with a catalytically effective surface is provided in each supporting tube.

2. A soot-particle filter according to claim 1, wherein the insert comprises tubes which are disposed concentrically with respect to one another and are mutually supported by formed-in supporting webs.

3. A soot-particle filter according to claim 1, wherein the insert is of a spiral design and has formed-in supporting webs which are supported on the respectively oppositely neighboring wall section of the insert.

4. A soot-particle filter according to claim 1, wherein the insert exhibits a star-shaped design cross-section.

5. A soot-particle filter according to claim 1, wherein the supporting tube and insert form a constructional unit.

6. A soot-particle filter according to claim 2, wherein the tubes of the insert are perforated sheet metal tubes.

7. A soot-particle filter according to claim 2, wherein the tubes of the insert are perforated ceramic tubes.

8. A soot-particle filter according to claim 2, wherein the tubes of the insert are perforated screen tubes.

* * * * *